United States Patent

Boothe et al.

[15] 3,678,953

[45] July 25, 1972

[54] FLUIDIC LEAD-LAG FREQUENCY RESPONSIVE CIRCUIT

[72] Inventors: Willis A. Boothe, Scotia, N.Y.; Anthony J. Healey, State College, Pa.

[73] Assignee: General Electric Company

[22] Filed: March 16, 1971

[21] Appl. No.: 124,807

[52] U.S. Cl. ............................................................137/81.5

[51] Int. Cl. ..........................................F15c 1/16, F15c 4/00

[58] Field of Search ................................................137/81.5

[56] References Cited

UNITED STATES PATENTS

| | | | |
|---|---|---|---|
| 3,324,891 | 6/1967 | Rhoades | 137/81.5 X |
| 3,515,158 | 6/1970 | Utz | 137/81.5 |
| 3,534,755 | 10/1970 | Urbanosky | 137/81.5 |
| 3,587,602 | 6/1971 | Urbanosky | 137/81.5 |
| 3,592,213 | 7/1971 | Smith | 137/81.5 X |

*Primary Examiner*—William R. Cline
*Attorney*—Paul A. Frank

[57] ABSTRACT

The circuit includes a high gain fluidic amplifier device in a forward circuit portion and a vortex fluidic device in a negative feedback circuit portion connected around the forward circuit. The vortex device may be a passive component utilizing only a control fluid input from the amplifier output, or may be an active component utilizing both the control (tangential) fluid input and a power fluid (radial) input supplied from a source of constant pressurized fluid.

14 Claims, 4 Drawing Figures

Inventors
Willis A Boothe
Anthony J. Healey
by Louis A. Moucha

FLUIDIC LEAD-LAG FREQUENCY RESPONSIVE CIRCUIT

Our invention relates to a fluidic stabilizing circuit, and in particular, to a fluidic circuit having a lead-lag frequency response and especially well adapted for hydraulic control system applications.

Various types of control systems require stabilization to prevent self-oscillation in the system. A conventional approach for stabilizing a control system. A conventional approach for stabilizing a control system is the use of a frequency responsive circuit known as a lead-lag circuit which has the effect of providing a phase lead over a prescribed frequency range to cancel or reduce unwanted phase lags in the system and thereby obtain stable closed loop system operation. In conventional Bode diagram representation of the dynamic characteristics of a lead-lag circuit, the gain vs. frequency response includes a positive change in slope from zero to 20 decibel per frequency decade at a frequency known as the lead-break, and a subsequent negative change in slope back to zero at a higher frequency known as the lag-break. A problem often occurs in the use of a lead-lag stabilizing circuit in hydraulic fluid control system applications in that a large time constant corresponding to the lead-break frequency is required in order to provide stable operation of the hydraulic control system.

In the prior art, stabilization in hydraulic control systems has been achieved by the use of mechanical moving part accumulators or long, large feedback lines of the inertance type to achieve the desired large time constants. Both approaches are undesirable since it is generally desirable to eliminate the use of any mechanical moving part devices which obviously are subject to various types of failure, and the long feedback lines occupy a large volume of space. Thus, there is a need for obtaining a stabilizing circuit especially applicable in hydraulic systems and which has no moving mechanical parts and does not occupy an excessive volume.

Therefore, one of the principal objects of our invention is to provide a stabilizing circuit of the lead-lag frequency responsive type which is adapted for use in pneumatic and hydraulic control systems.

Another object of our invention is to utilize vortex fluidic devices in the stabilizing circuit.

A further object of our invention is to utilize passive or active vortex fluidic devices in negative feedback portions of the stabilizing circuit.

Briefly summarized, our invention is a fluidic lead-lag frequency responsive circuit which includes a high gain fluidic amplifier device or devices in the forward circuit portion and a vortex fluidic device or devices in negative feedback circuit portions connected around the high gain amplifier. The time constant of the vortex device governs the lead-break frequency and can be adjusted to a desired value by proportioning the flow rate through the vortex device. The vortex device may be of the passive type utilizing only a control fluid input directed tangentially into the device, or may be of the active type utilizing both the control input and a radially power fluid input supplied from a source of constant pressurized fluid.

The features of our invention which we desire to protect herein are pointed out with particularity in the appended claims. The invention itself, however, both as to its organization and method of operation, together with further objects and advantages thereof may best be understood by reference to the following description taken in connection with the accompanying drawings wherein:

Figure 1:
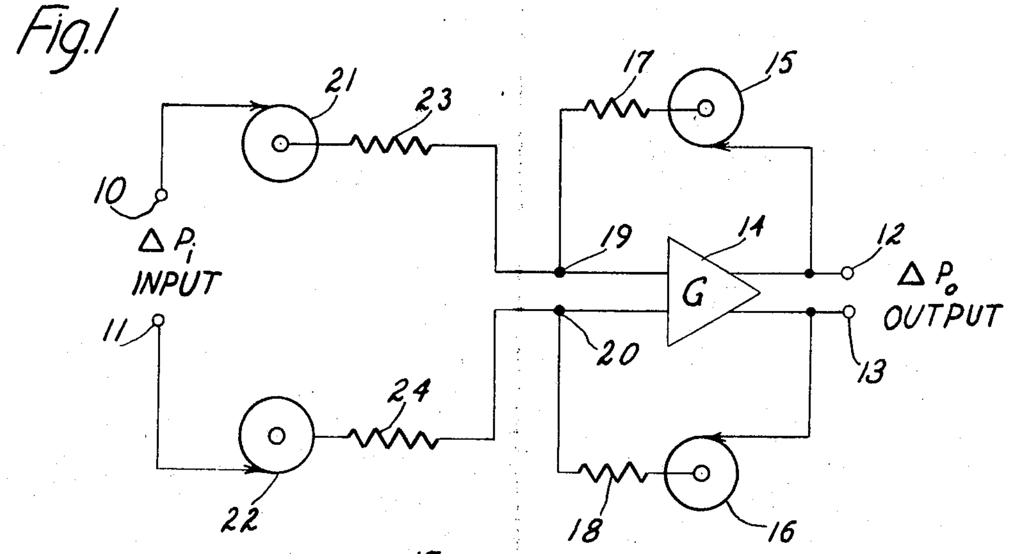
FIG. 1 is a schematic diagram of a lead-lag circuit constructed in accordance with our invention and utilizing passive vortex fluidic devices.

Referring now to FIG. 1, there is shown in schematic form a first embodiment of our lead-lag frequency responsive circuit. This circuit is serially connected within the forward circuit portion of a control system (not shown) which it is intended to stabilize. The entire control system, or portions thereof, may utilize a pneumatic fluid such as pressurized air or some other gas, or a hydraulic fluid such as oil. Thus, our lead-lag circuit is capable of operation with a gaseous or liquid medium, and its advantage is particularly emphasized in hydraulic control systems wherein conventional stabilization devices have disadvantages as mentioned hereinabove.

The input and output of the lead-lag circuit is indicated by terminals 10, 11 and 12, 13, respectively, the terminals comprising suitable fittings for coupling a control system pressurized fluid signal through appropriate fluid flow passages to and from the stabilizing circuit. Alternatively, the lead-lag circuit may be formed integrally with other fluid amplifier circuitry comprising portions of the control system in which case no fittings are necessary and the input and output of the lead-lag circuit are merely fluid flow passages providing the desired interconnection.

Our lead-lag circuit basically comprises a high gain fluidic forward circuit portion and a negative feedback circuit portion which includes vortex fluidic devices and appropriate interconnecting fluid flow passages. The high gain forward circuit 14 may comprise a plurality of serially connected proportional type fluid amplifiers each utilizing a power fluid inlet, a pair of receivers downstream of the power fluid inlet, and a pair of opposed control fluid inlets intermediate the power fluid inlet and receivers. As one example, the amplifiers may be of the type illustrated in U.S. Pat. No. 3,534,755 to T.F. Urbanosky, and assigned to the assignee of the present invention, wherein such plurality of serially connected amplifiers are described as a "gain block". Other types of no moving mechanical part devices for obtaining a high forward gain which may be utilized include vortex fluid amplifiers of the type illustrated in U.S. Pat. No. 3,324,891 to J. M. Rhoades, and assigned to the assignee of the present invention. The vortex fluid amplifier devices may be serially connected to form the high gain forward circuit 14 or may be used only in the high power output stages thereof. High gain forward circuit 14 may thus utilize any suitable fluid amplifiers having no moving mechanical parts and, if desired under the circumstances, may even utilize having moving mechanical parts.

Differential pressurized fluid signals, $\Delta P$, are most often employed in fluid amplifier circuitry as opposed to single-ended signals, and a differential pressurized input fluid signal $\Delta P_i$ is indicated as being applied to the input terminals 10, 11 and supplied to twin inputs of high gain amplifier device 14. It should be understood, however, that our invention is also useful in systems utilizing single-ended pressurized fluid signals in which case only one input terminal would be employed for providing a single input to amplifier device 14, and only a single feedback circuit would be associated therewith. Thus, although the description hereinafter will be with reference to differential pressurized signals, it should be understood that the circuit may also be operated with single-ended signals. In the case of a differential input signal, a differential pressurized output signal $\Delta P_o$ is developed across output terminals 12 and 13. It should be obvious that the use of the aforementioned vortex fluid amplifiers in the forward circuit 14 requires paralleling two such devices per amplifier stage when developing a differential output signal $\Delta P_o$.

Negative feedback circuitry is connected around high gain forward circuit 14, and in the more general case of differential pressurized fluid signals, first and second negative feedback circuits are connected around forward circuit 14 and include identical passive vortex fluidic devices 15 and 16.

Passive vortex fluidic devices 15, 16 are described in detail in the aforementioned U.S. Pat. No. 3,324,891, and briefly, each comprises a cylindrical chamber provided with a tangential control input which in our application is connected to an output of amplifier 14. The centrally located outputs of vortex devices 15 and 16 are connected to corresponding inputs of forward amplifier 14, either as separate inputs thereto, or by means of junctures to which is also supplied the input signal $\Delta P_i$. In the latter case, fluidic summing resistors 17 and 18 may be connected between the outputs of vortex devices 15 and 16 and the summing junctures 19 and 20, if desired, or required by the particular circumstances. The resistors 17 and 18 are linear fluid flow restrictors of the type also disclosed in U.S. Pat. No. 3,534,755 and may also be used to adjust the flow rates from the outputs of vortex devices 15 and 16, respectively. In many instances, restrictors 17 and 18 are not required, and can be omitted.

Figure 3:
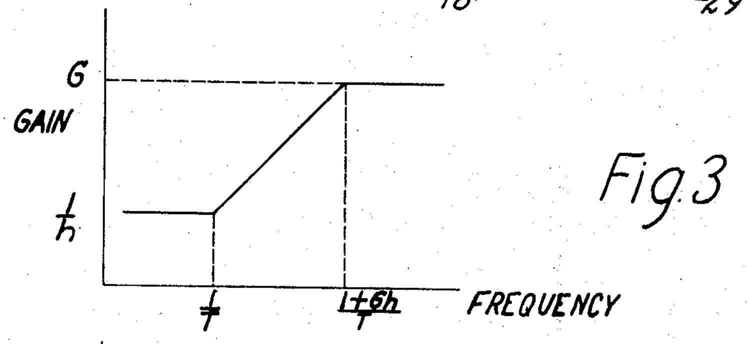
FIG. 3 is a Bode diagram representation of the gain vs. frequency response of our lead-lag circuit.
Figure 4:
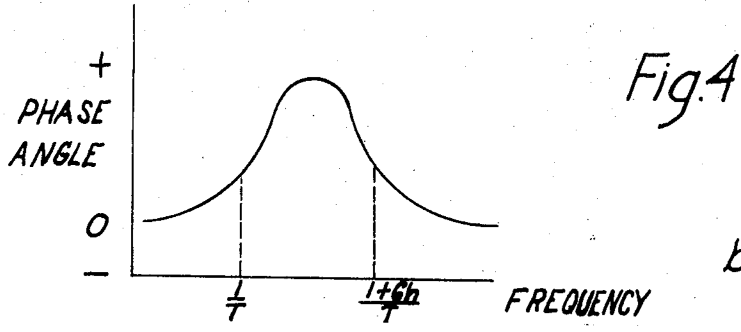
FIG. 4 is a Bode diagram representation of the phase angle vs. frequency response of our lead-lag circuit.

Forward circuit 14 includes an odd number of serially connected amplifier stages to provide a substantially 180° phase reversal to the fluid signal at the output terminals 12, 13 relative to the corresponding input terminals 10, 11. Since the passive vortex devices 15, 16 do not subject the fluid signal passing therethrough to a phase reversal, the feedback circuits are in negative feedback circuit relationship to forward circuit 14. Vortex devices 15 and 16 can be approximated mathematically in control system nomenclature as the transfer function $H = h/1 + TS$ where $h$ is an attenuation factor less than unity, "T" is a time constant, and "S" is the Laplace operator d( )/d$t$. Thus, vortex devices 15, 16 are approximated by a single time constant which is equal to the "flushing time" of the device, that is, the volume divided by the rate of flow through the vortex device. By a proper proportioning of the flow rate or the volume of the device, the vortex device time constant $T$ can be set to any desired value over a large range of time constant values. The passive vortex fluidic devices 15, 16 thus determine a lag $1/1 + TS$ in the feedback circuit and the linear restrictors 17, 18 is utilized, primarily determine the attenuation factor $h$. The high gain forward circuit 14 can be expressed mathematically merely as a gain G since any time constant associated therewith is sufficiently small such that it is far removed from the lead and lag time constants of the closed loop lead-lag circuit. It is well known in control system (servomechanism) theory that the closed loop gain $G/1 + GH$ for a circuit having a forward network G and a negative feedback network $H$ ($H = h/1 + TS$ in our case) reduces to the mathematical expression (transfer function):

$$\frac{\Delta P_0}{\Delta P_i} = \frac{G}{1+Gh}\,\frac{(1+TS)}{\left(1+\dfrac{TS}{1+Gh}\right)}$$

for the condition where the open loop steady state gain $Gh$ is substantially greater than unity, assumed for our lead-lag circuit. This closed loop gain expression $\Delta P_o/\Delta P_i$ indicates that the lead-lag circuit gain is low at low frequencies where the feedback is effective, and is high at high frequencies where the feedback has little effect. Thus, at frequencies less than $1/T$ radians per second, the closed loop gain is substantially independent of the forward gain G and is dictated primarily by 1/$h$, a function of the passive vortex device characteristics if linear restrictors 17, 18 are not utilized. If utilized, then 1/i h is primarily a function of the restrictor 17, 18 characteristics. At frequencies higher than 1 + $Gh/T$, the closed loop gain is G. The expression $1 + TS$ in the numerator of the closed loop transfer function $\Delta P_o/\Delta P_i$ is associated with the lead-break frequency and on the Bode diagram representation of the gain and phase angle versus frequency response, FIGS. 3 and 4, respectively, the lead break occurs at the frequency $\omega = 1/T$. In like manner, the expression $$\left(1+\frac{TS}{1+Gh}\right)$$

in the denominator is associated with the lag-break frequency which occurs at the higher frequency $\omega = 1 + Gh/T$.

The passive vortex fluidic devices 15 and 16 may be described as vortex "diodes" in that the vortical flow therethrough is always in the high restriction direction from the tangential control inlet to the centrally located outlet. The passive vortex device is a square-law device having steady-state pressure-flow characteristics similar to that of a sharp edged orifice. For this reason, similar vortex diodes 21 and 22, or other square-law flow restrictor devices such as orifices, are connected in the input circuits of high gain amplifier 14 to match the square-law devices in the feedback circuitry and thereby assure steady-state linear output $\Delta P_o$ versus input $\Delta P_i$ characteristics. The vortex devices 21, 22 in the input circuits are proportioned to have negligible time constants by scaling down the dimensions thereof relative to the dimensions of vortex devices 15, 16. Finally, linear fluid flow (fluidic) restrictors 23 and 24 are shown connected between the outputs of devices 21 and 22 and junctures 19 and 20 to serve as summing resistors, or in the case of direct connections to the input to high gain amplifier 14, for adjusting the flow rates through vortex devices 21 and 22. Again, as in the case of the feedback circuits, the linear restrictors 23 and 24 are not, in general, necessary.

Figure 2:
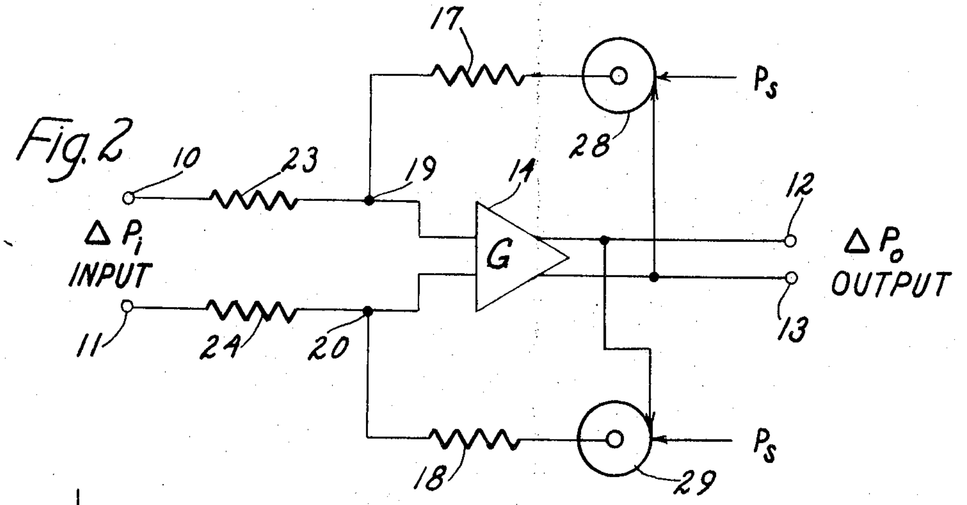
FIG. 2 is a second embodiment of our lead-lag circuit utilizing active vortex fluidic devices.

FIG. 2 illustrates a second embodiment of our lead-lag circuit, and in this particular embodiment utilizes active vortex fluidic devices in the feedback circuits. Thus, a first vortex type fluid amplifier 28 is provided, having a tangential control fluid inlet connected to a first output of high gain fluidic amplifier circuit 14, and the vortex fluid amplifier outlet connected to a corresponding second input of amplifier 14. Similarly, a second vortex fluid amplifier 29 is connected from a second output of amplifier 14 and the output of amplifier 29 is connected to a corresponding first input of amplifier 14. The tangential control fluid inlet connections from the high gain fluidic amplifier 14 are reversed from that of the FIG. 1 embodiment since the active vortex fluid amplifier develops an approximately 180° phase reversal between its input and output terminals, and high gain amplifier 14 is again assumed to comprise an odd number of serially connected amplifier stages. It should be obvious that in both the FIGS. 1 and 2 embodiments, the forward gain circuit 14 can comprise an even number of amplifier stages in which case the feedback connections are reversed from that illustrated at the output or input of forward circuit 14.

In the FIG. 1 embodiment, the output flow (and pressure) of passive vortex devices 15 and 16 increases as the tangential control pressure increases whereas in the FIG. 2 embodiment, the output flow (and pressure) of active vortex devices 28 and 29 decreases as the tangential control pressure increases thereby necessitating the reversal of connections in the feedback circuits. The radial power fluid inputs to vortex devices 28 and 29 are connected to a suitable source of constant pressurized fluid $P_s$. The active vortex fluid amplifier can be designed to have a linear steady-state pressure-flow characteristic and thus square-law flow restrictor devices are not necessary in the input circuit as in the case of the FIG. 1 embodiment. Linear restrictors 23 and 24 may be utilized in the input circuit of high gain forward amplifier 14 to serve as summing resistors in the case where the feedback and input signals are supplied to junctures 19 and 20. Linear restrictors 17 and 18 may be connected in the feedback circuits as summing restrictors and for adjusting the vortex fluid amplifier outputs. The transfer function $h/1 + TS$ for the vortex devices 28, 29 is similar to that of devices 15, 16 with the exception that the gain $h$ is capable of being greater than unity. Again in the case wherein linear restrictors 17, 18 are included in the feedback circuits, the lag time constant $T$ is determined by vortex devices 28, 29, and the attenuation or gain factor h is determined primarily by devices 17, 18.

From the foregoing description, it is apparent that the objects of our invention have been met. Thus, our invention utilizes vortex fluidic devices of the passive or active type to provide a lag in negative feedback circuitry connected around a high gain fluidic amplifier. The dynamics of the vortex fluidic devices can be characterized as a single time constant and a gain or attenuation factor and result in the closed loop circuit having a low gain at low frequencies where the feedback is effective, and high gain at high frequencies where the feedback has little effect. Since the feedback vortex devices can be proportioned to provide relatively large time constants, $T$, the lead-lag circuit is especially well adapted to provide stabilization in hydraulic control system applications such as those employing hydraulic servos where large time constants are present. The lead-break time constant $T$ can be set to a desired value by a proper selection of dimensions for the vortex devices. Thus, different dimension devices provide different time constants. The lead-break time constant can also be varied for the active vortex device by varying supply pressure $P_s$. The vortex devices 15, 16 and 28, 29 have no moving mechanical parts and thus are not subject to the usual types of failure inherent with devices having moving parts. Finally, the vortex devices do not occupy a large volume and therefore are well adapted for use in control systems operating in a limited space. The scope of our invention is defined by the following claims.

What we claim as new and desire to secure by Letters Patent of the United States is:

1. A fluidic lead-lag frequency responsive circuit comprising means for amplifying an input pressurized fluid signal $P_i$, and vortex fluidic means connected in negative feedback circuit relationship with said signal amplifying means to thereby obtain at the output thereof a pressurized fluid signal $P_o$ related to the input signal as $$\frac{P_0}{P_i}=\frac{G}{1+Gh}\,\frac{1+T_1S}{1+T_2S}$$

where $G$ and $h$ are the respective gains of said signal amplifying means and said vortex fluidic means, $T_1$ and $T_2$ are time constants wherein $T_1 > T_2$, $T_1$ being the time constant associated with said vortex fluidic means and $T_2 = T_{1/} 1 + Gh$.

2. The fluidic lead-lag frequency responsive circuit set forth in claim 1 wherein said vortex fluidic means comprises a vortex fluidic device provided with a tangential control input connected to the output of said signal amplifying means.

3. The fluidic lead-lag frequency responsive circuit set forth in claim 1 wherein said vortex fluidic means comprises a vortex fluidic device provided with only one input consisting of a tangential control input connected to the output of said signal amplifying means.

4. The fluidic lead-lag frequency responsive circuit set forth in claim 1 wherein said vortex fluidic means comprises a vortex fluid amplifier provided with a tangential control input connected to the output of said signal amplifying means, and a radial input connected to a source of constant pressurized fluid.

5. The fluidic lead-lag frequency responsive circuit set forth in claim 4 wherein the time constant $T_1$ can be varied by varying the pressure of the fluid supplied to the radial input.

6. The fluidic lead-lag frequency responsive circuit set forth in claim 1 wherein said signal amplifying means is provided with a pair of inputs adapted to be supplied with a differential input pressurized fluid signal $\Delta P_i$, and provided with a pair of outputs for developing a differential output pressurized fluid signal $\Delta P_o$, and said vortex fluidic means comprise first and second vortex fluidic devices connected respectively in first and second negative feedback circuits each characterized by the transfer function expression $h/1 + T_1S$, the negative feedback circuit connection being from outputs of said signal amplifying means to the inputs thereof, the output pressure fluid signal $\Delta P_o$ related to the input signal $\Delta P_i$ as $$\frac{\Delta P_0}{\Delta P_i}=\frac{G}{1+Gh}\,\frac{1+T_1S}{1+T_2S}.$$

7. The fluidic lead-lag frequency responsive circuit set forth in claim 6 wherein said signal amplifying means provides a substantially 180° phase reversal between the inputs and outputs thereof, and said first and second vortex fluidic devices are passive devices provided only with tangential control inputs respectively connected to first and second of said pair of outputs of said signal amplifying means, outputs of said first and second vortex fluidic devices respectively connected to corresponding first and second of said pair of inputs of said signal amplifying means.

8. The fluidic lead-lag frequency responsive circuit set forth in claim 7 and further comprising third and fourth passive vortex fluidic devices connected in input circuits of said signal amplifying means, said third and fourth vortex fluidic devices provided only with tangential control inputs connected to a source of the input signal $\Delta P_i$ and having outputs connected to the inputs of said signal amplifying means, said first, second, third and fourth vortex fluidic devices being square-law devices having similar steady-state square-law pressure-flow characteristics whereby the lead-lag circuit provides steady-state linear output $\Delta P_o$ versus input $\Delta P_i$ characteristics, said third and fourth vortex fluidic devices having negligible time constants compared to the time constants $T_1$ of said first and second vortex fluidic devices.

9. The fluidic lead-lag frequency responsive circuit set forth in claim 6 wherein said signal amplifying means provides a substantially 180° phase reversal between the inputs and outputs thereof, and said first and second vortex fluidic devices are active devices provided with tangential control inputs respectively connected to said first and second of said pair of outputs of said signal amplifying means and with radial inputs connected to a source of constant pressurized fluid, outputs of said first and second active vortex fluidic devices respectively connected to corresponding second and first of said pair of inputs of said signal amplifying means to thereby obtain the negative feedback relationship.

10. The fluidic lead-lag frequency responsive circuit set forth in claim 9 and further comprising first and second linear fluidic restrictors connected in input circuits of said signal amplifying means, said first and second active vortex fluidic devices exhibiting linear pressure-flow characteristics whereby the lead-lag circuit provides steady-state linear output $\Delta P_o$ versus input $\Delta P_i$ characteristics.

11. The fluidic lead-lag frequency responsive circuit set forth in claim 6 and further comprising first and second linear fluidic restrictors respectively connected in the first and second negative feedback circuits in series circuit relationship with said first and second vortex fluidic devices at the outputs thereof.

12. The fluidic lead-lag frequency responsive circuit set forth in claim 6 and further comprising first and second linear fluidic restrictors respectively connected in input circuits of said signal amplifying means, inputs to said first and second linear restrictors connected to a source of the input signal $\Delta P_i$ and outputs of said restrictors connected to the inputs of said signal amplifying means.

13. The fluidic lead-lag frequency responsive circuit set forth in claim 1 wherein said signal amplifying means comprises a plurality of serially connected proportional type fluid amplifiers to thereby obtain a high forward gain, said fluid amplifiers having no moving mechanical parts, and said vortex fluidic means proportioned to provide a relatively large time constant $T_1$ whereby the lead-lag circuit is especially well adapted to provide stabilization in hydraulic control systems where large time constants are present.

14. The fluidic lead-lag frequency responsive circuit set forth in claim 1 wherein the time constant $T_1$ is determined by the dimensions of said vortex fluidic means.

* * * * *